United States Patent Office 3,180,711
Patented Apr. 27, 1965

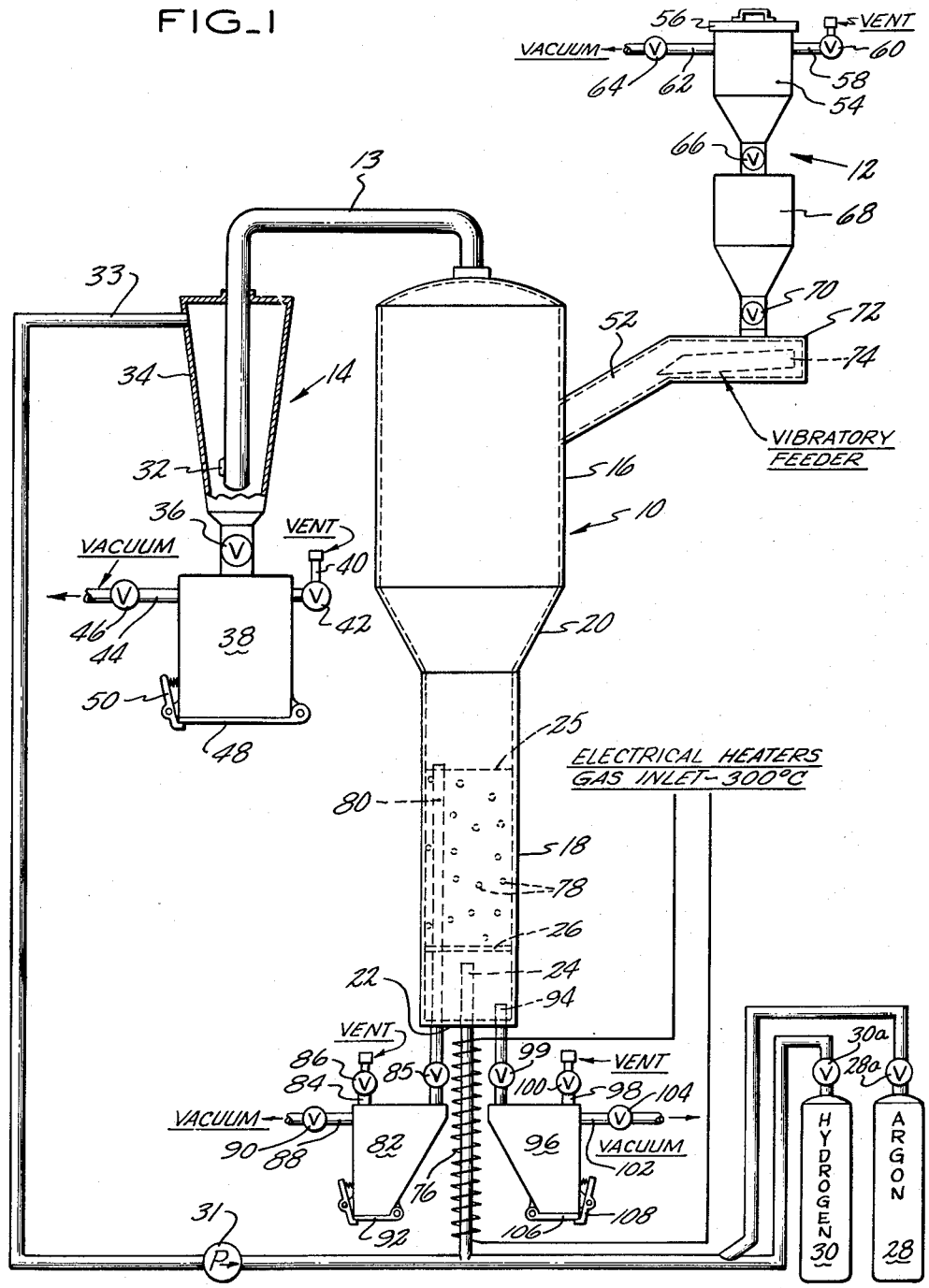

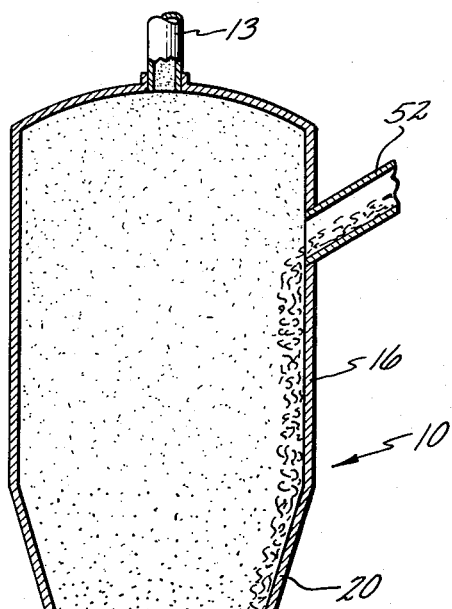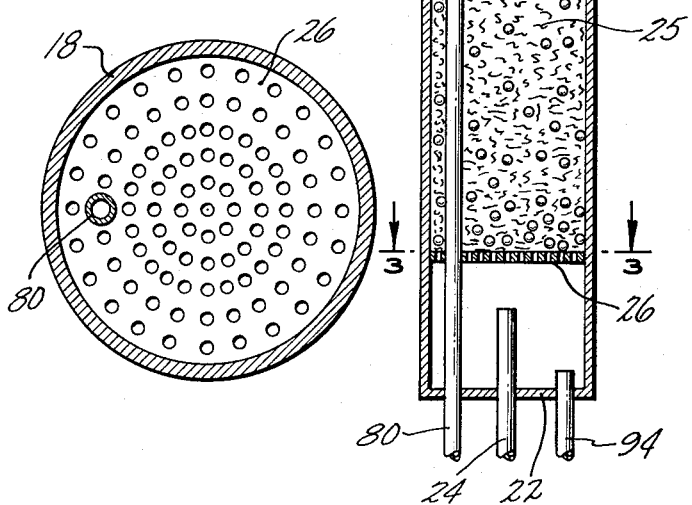

3,180,711
SCRAP RECOVERY DEVICE
Simon S. Aconsky, Wallingford, Conn., assignor to United Aircraft Corporation, East Hartford, Conn., a corporation of Delaware
Filed June 26, 1961, Ser. No. 119,599
4 Claims. (Cl. 23—284)

This invention relates to a device and a method for the continuous hydriding, grinding and separation, in the form of a powder, of scrap refractory metals such as columbium, zirconium and titanium, which are capable of being embrittled by hydriding. In the case of these metals, if it is attempted to make a billet by compressing scrap-metal turnings, for example, the billet is very spongy, or porous. However, if the scrap is hydrided and reduced to a powder by grinding, a satisfactory billet can be made from the powder by pressing the powder in a die into 1″ x 1″ x 7″ bars, welding these end-to-end and using the resulting rod as a negative consumable electrode in an electric arc furnace. A water-cooled copper crucible is made the other and positive electrode. The furnace is enclosed in a housing which is maintained evacuated, so that the hydrogen which is given off by the metallic powder will be continuously withdrawn. Hydrogen is given off as the electrode is consumed because, above 700° C., hydrogen has negligible solubility in these refractory metals and the temperature of the arc is well above 700° C. As the consumable electrode is fed into the crucible a very dense billet is formed of the dehydrided metal in the crucible.

It should be noted that the same final dense billet will not result if the consumable electrode, in the process above-described, is formed by pressing the metal scrap directly to form the billets from which the electrode is made. If this is attempted, the spongy nature of the metal scrap billets comprising the electrode will be carried over into the billet formed in the crucible and the final billet will be worthless.

It is an object of the present invention to provide a device and a method for reducing refractory metal scrap to a powder from which a dense billet can be made by the above electric furnace process.

It is another object of the invention to provide a reactor for reducing refractory scrap metal to a powder by a continuous noncontaminating process.

These and other objects and advantages will be evident or will be pointed out in connection with the following detailed description of a preferred embodiment of the invention shown in the accompanying drawings. In these drawings:

FIG. 1 is a somewhat diagrammatic showing of a novel reactor used in carrying out the invention;

FIG. 2 is a somewhat enlarged sectional view of a portion of the reactor;

FIG. 3 is a sectional view taken on line 3—3 of FIG. 2.

In the following description of the reactor and the method of using it, the invention has been described in connection with the recovery of columbium scrap turnings. It will be understood, however, that it is equally applicable to the other refractory metals and to scrap in varying forms.

The reactor shown in FIG. 1 consists of a vertical, cylindrical hopper, generally indicated at 10, into which scrap turnings or chips are introduced continuously by a chip-feeding device 12. The fractionated material in the form of a powder is withdrawn at the top of the reactor through a pipe 13 and separated from the gas stream in a cyclone separator 14. The hopper has an upper large-diameter chamber 16 and a lower small-diameter chamber 18. The two chambers are connected by a frusto-conical housing section 20. The hopper is provided with a bottom closure 22 through which a high-velocity gas stream is directed by means of a pipe 24. A mixture of argon and hydrogen gas is supplied through pipe 24 to pick up the scrap turnings which are supported on a foraminous plate, or screen, 26 secured to the housing of chamber 18 in spaced relation above the bottom 22 thereof. The holes in plate 26 are of such size and spacing as to permit a free flow of gas therethrough while preventing the bed 25 of coarse scrap turnings in chamber 18 from dropping through the plate. This plate 26 is in the nature of a tuyere, except that it is larger in cross section, covering the entire cross-sectional area of chamber 18. The relative diameters of chambers 16 and 18 and the gas velocity used are important to obtain the grinding action desired and the subsequent separation of the finer particles from the scrap bed resting on plate 26. The proportions should be about as shown in the drawings, i.e., chamber 16 should be about twice the diameter of chamber 18 and chamber 18 should have a length about four times its diameter. The depth of the chip bed resting on plate 26 should be roughly equal to twice the diameter of chamber 18. The gas velocity through the chip bed should be about twelve feet per second in order to fluidize the lighter particles which are withdrawn through the top of the hopper. This gas stream also agitates the chips in chamber 18, which are reacted by the hydrogen and become brittle, causing them to be tumbled and ground.

The pipe 24 is connected to a supply 28 of argon gas under pressure and a supply 30 of hydrogen gas under pressure, so that these gases in the correct proportion may be supplied separately under the control of valves 28a and 30a. During the operation of the reactor the system is charged with gas in the proportion of 40% hydrogen and 60% argon. A pump 31 circulates the gas through the reactor. This gas stream comprises the fluidizing and reacting gas acting on the scrap turnings in chamber 18. The hydrogen gas causes the chips to become embrittled, and as the gas passes through the bed of chips in chamber 18 the smaller particles are blown by the gas stream into upper chamber 16, separation taking place in the zone 20. The heavier particles fall back into chamber 18 and the lighter particles are completely fluidized and pass out through the top of the hopper through pipe 13.

The finer particles passing through the cyclone separator 14 are directed by a nozzle 32 tangentially against the inclined side wall 34 and, due to the increased diameter of the separator chamber and resulting decrease in gas velocity, drop to the bottom of the chamber. These lighter particles, which are in powder form, are periodically discharged into a container 38 by opening a shutoff valve 36. The latter container has a vent 40 to atmosphere controlled by a shutoff valve 42 and also has a vacuum connection 44 controlled by shutoff valve 46, the purpose of which will be explained later. Door 48 in the bottom of the container is controlled by a manual latch 50, which permits the powder in the container to be collected periodically.

The chips or turnings to be treated are introduced continuously into chamber 16 through a downwardly inclined pipe 52, which is supplied through an interlocking hopper system which forms a part of the chip-feeding device 12. This consists of an upper hopper 54 having a removable cover 56 through which the chips are introduced and a vent 58 controlled by a shutoff valve 60. Hopper 54 also has a vacuum connection 62 controlled by a shutoff valve 64. Hopper 54 discharges through a shutoff valve 66 into a lower hopper 68 which discharges through a control valve 70 into a horizontal section 72 of the scrap inlet pipe 52. The scrap, under the control of valve 70, is fed into the inclined pipe 52, in measured amounts, by a vibratory feeder 74.

A heater coil 76 in the form of a Nichrome wire is wound around the external portion of inlet pipe 24 to raise the temperature of the incoming gas to 300° C.

In order to accelerate the grinding of the brittle scrap in chamber 18, a plurality of hardened balls 78 are provided in chamber 18. These balls are constantly agitated by the fluid stream, breaking up the embrittled scrap during the process.

An overflow pipe 80 extends through the bottom 22 of the reactor and through plate 26 to the top of the chip bed 25. This pipe prevents the chip bed from building up to too great a height, which would increase the pressure drop in the gas stream and reduce the fluidizing effect of the stream. Pipe 80 discharges into a container 82 similar to container 38. This container has a vent 84 controlled by a shutoff valve 86 and a vacuum connection 88 controlled by a shutoff valve 90. Latched door 92 permits removal of chips which can be reintroduced to the reactor through the feeding device 12.

An underflow pipe 94 extends upwardly through the bottom 22 of the hopper and terminates in the space below plate 26. This provides means for withdrawing any scrap or fines which may fall through the bed, preventing them from collecting on the bottom 22 and obstructing the gas flow.

A container 96, similar to container 82, is provided to receive material from pipe 94. This container has a vent 98 controlled by a shutoff valve 100, and a suction connection 102 controlled by a shutoff valve 104. The material collected in container 96 can be withdrawn through a cover 106 controlled by a latch 108.

In the operation of the reactor, argon gas is first introduced for a period of about fifteen minutes to completely purge the system of air. The gas velocity during purging of the system is kept low enough to prevent fluidization of the scrap in the bed 25. During this purging operation, valves 70, 66 and 60 of the feeding mechanism 12 should be open; likewise, valves 36 and 42, associated with separating mechanism 14, should be open; also, valves 86 and 100 should be open to allow the argon gas to displace the air in receptacles 82 and 96. Either before or during this purging operation, metal scrap is introduced into hopper 54 and hopper 68, and open valve 70, to the reactor chamber 16, until the bed of metal scrap 25, above plate 26, has reached the upper end of overflow pipe 80. Control valve 70 and shutoff valve 66 are then closed with the hoppers 54 and 68 full of scrap. At the end of this purging operation, the vent valves 60, 42, 86 and 100 should be closed and the shutoff valve 36 should likewise be closed.

The normal hydriding fluid stream composed of 60% argon and 40% hydrogen is now supplied through pipe 24. As the gas passes through the bed of chips 25 in chamber 18, the latter are embrittled by the hydrogen gas as they are agitated by the gas stream. This agitation, enhanced by the presence of balls 78, causes the chips to be broken and ground, and the lighter particles to be fluidized and blown upwardly into upper chamber 16. As these lighter particles pass through section 20, separation of the lighter particles from the heavier particles takes place due to the reduction in velocity of the gas stream, the heavier particles falling back into chamber 18 while the lighter particles which are sufficiently fluidized pass off with the gas stream through pipe 13 into separator 14. Here the metal particles are separated from the gas stream in a well-known manner and collect in the bottom of the cyclone hopper, the gas passing out at the top of the hopper through recirculating pipe 33.

As this operation continues, new scrap is more or less continuously fed from hopper 68 through control valve 70 into pipe 52. These heavier chips immediately fall into chamber 18 where they are subjected to the embrittling action of the hydrogen gas.

Periodically, valve 36 of the cyclone separator is opened to allow the accumulated powder to fall into receptacle 38. Likewise, the hopper 68 is replenished from hopper 54, as needed.

When receptacle 38 becomes full of metal powder, valve 46 in the vacuum line is opened and the receptacle is purged of hydrogen and argon gas with shutoff valve 36 closed. Valve 42 is then opened to admit air into receptacle 38, permitting the door 48 to be opened and the powder collected. Valve 42 is then closed and valve 46 opened to exhaust the air in receptacle 38.

When it becomes necessary to replenish the metal chips in hopper 54, valve 66 is closed and valve 64 is opened to withdraw the hydrogen gas present in hopper 54. Valve 64 is then closed and valve 60 is opened to admit air. The cover 56 can then be removed and the hopper can be filled with a new supply of metal chips. The cover 56 is then replaced, valve 60 is closed, valve 64 is opened, and the air is exhausted from hopper 54 through vacuum line 62, after which valve 64 is closed. Chips can now be fed from hopper 54 into hopper 68 by opening the shutoff valve 66. By means of this interlocking system the escape of hydrogen from the system is prevented and also the admission of air into the system is prevented.

If the bed of chips 25 becomes too deep, i.e., rises too high in chamber 18, surplus chips will fall through pipe 80 and, by opening valve 85, they may be admitted to hopper 82. When hopper 82 becomes full, these chips can be recovered by closing valve 85, opening valve 90 to exhaust the gases in hopper 82, closing valve 90, opening valve 86 to admit air to the hopper, after which the cover 92 can be opened to empty the hopper. Valve 86 is then closed and valve 90 is opened to exhaust the air in the hopper.

The chips beneath the perforated plate 26 can be withdrawn through the pipe 94 by opening valve 99 to admit any metal particles to hopper 96, after which the valve 99 is closed. Hopper 96 can be purged and emptied in the same manner as described in connection with hopper 82 above.

The powder taken from receptacle 38 is then melted by pressing it into billets, welding the billets into a consumable electrode, and forming a final billet in an electrical furnace, as previously described.

The gas discharged through pipe 33 is reintroduced into pipe 24 by means of a pump 31, together with a certain amount of makeup hydrogen gas which is added to the recycled gas, as needed, to maintain the hydriding action of the gas.

As a result of the above-described apparatus and method, it will be evident that a reactor and a method of reacting scrap turnings of columbium, as well as other refractory metals, have been provided which is continuous in operation and which does not in any way contaminate the metal being recovered.

While only one form of the reactor has been shown and described, it will be evident that various changes in the construction and arrangement of the parts may be resorted to without departing from the scope of the invention.

I claim:

1. A device for the continuous recovery of refractory metal scrap in the absence of air comprising a vacuum-tight reactor having an upright housing closed at the top and bottom, said housing enclosing an elongated upper chamber, an intermediate chamber, and a lower chamber of substantially the same length as said upper chamber, said upper chamber having a diameter approximately twice the diameter of said lower chamber and said lower chamber having a length approximately four times its diameter, said intermediate chamber comprising a conical transition chamber connecting said upper and lower chambers and having a length less than the length of said upper and lower chambers, a foraminous member extending across said lower chamber at a level above the bottom thereof, means for introducing a hydriding gas under pressure to said lower chamber beneath said member, means for heating said gas prior to its introduction into said chamber, means for continuously introducing metal scrap to said housing above said member in the absence of air, grinding means included in said lower chamber for grinding said scrap as it becomes embrittled by said hydriding gas, said grinding means including a few hard discrete members which are light enough to be picked up with said scrap by the gas stream and tumbled with said scrap in said lower chamber, means for discharging said gas through the top of said housing together with metal particles which are light enough to remain entrained in the gas stream as the latter passes at reduced velocity through said larger diameter upper chamber, means for separating said lighter particles from said discharged gas in the absence of air, and means for re-introducing said discharged gas to said lower chamber.

2. A reactor as defined in claim 1 in which the means for introducing a hydriding gas to said lower chamber includes means for introducing a mixture of approximately 40% hydrogen gas and 60% argon gas.

3. A reactor as defined in claim 1 having a cyclone separator for collecting the metal particles from the discharged gas.

4. A reactor as defined in claim 1 including an overflow pipe which extends upwardly through the bottom of the housing and through the foraminous member and terminates in said lower chamber at a point intermediate said foraminous member and said intermediate chamber whereby the normal depth of the scrap metal bed is determined.

References Cited by the Examiner
UNITED STATES PATENTS

| | | | |
|---|---|---|---|
| 2,107,279 | 2/38 | Balke et al. | 75—84 |
| 2,186,659 | 1/40 | Vogt | 75—55 |
| 2,207,461 | 7/40 | Kemp | 75—63 |
| 2,397,352 | 3/46 | Hemminger | 260—683.3 |
| 2,503,788 | 4/50 | White | 23—284 |
| 2,513,569 | 7/50 | Kuehlthau | 266—25 |
| 2,635,956 | 4/53 | Wilhelm et al. | 75—0.5 |
| 2,683,077 | 7/54 | Lewis | 23—288.3 |
| 2,789,773 | 4/57 | Stauber | 241—47 |
| 2,825,945 | 3/58 | Ulrech et al. | 266—34 |
| 2,843,473 | 7/58 | Colbry | 75—63 |
| 2,850,371 | 9/58 | Brooks et al. | 75—9 |
| 2,941,862 | 6/60 | Cyr et al. | 23—284 X |
| 2,948,587 | 8/60 | Johnson et al. | 28—288.3 |
| 2,960,330 | 11/60 | Lobbecke | 266—25 |
| 3,012,876 | 12/61 | Eaton et al. | 75—84.5 |
| 3,049,421 | 8/62 | Allen et al. | 75—0.5 |

MORRIS O. WOLK, *Primary Examiner.*

RAY K. WINDHAM, JAMES H. TAYMAN, Jr.,
*Examiners.*